United States Patent
Farmer et al.

(10) Patent No.: US 9,158,070 B2
(45) Date of Patent: Oct. 13, 2015

(54) ACTIVE TAPERS WITH REDUCED NONLINEARITY

(75) Inventors: Jason N. Farmer, Vancouver, WA (US); Joona Koponen, Vantan (FI); Matthieu Saracco, Vancouver, WA (US)

(73) Assignee: nLight Photonics Corporation, Vancouver, WA (US)

( * ) Notice: Subject to any disclaimer, the term of this patent is extended or adjusted under 35 U.S.C. 154(b) by 894 days.

(21) Appl. No.: 13/339,037

(22) Filed: Dec. 28, 2011

(65) Prior Publication Data

US 2012/0127563 A1    May 24, 2012

Related U.S. Application Data

(63) Continuation-in-part of application No. 12/757,737, filed on Apr. 9, 2010, now Pat. No. 8,711,471, which is a continuation of application No. 12/545,791, filed on Aug. 21, 2009, now abandoned.

(60) Provisional application No. 61/090,854, filed on Aug. 21, 2008.

(51) Int. Cl.
| | |
|---|---|
| H01S 3/00 | (2006.01) |
| G02B 6/14 | (2006.01) |
| H01S 3/067 | (2006.01) |
| H01S 3/08 | (2006.01) |
| H01S 3/0941 | (2006.01) |

(52) U.S. Cl.
CPC .............. *G02B 6/14* (2013.01); *H01S 3/06754* (2013.01); *H01S 3/06745* (2013.01); *H01S 3/08045* (2013.01); *H01S 3/09415* (2013.01); *H01S 2301/03* (2013.01)

(58) Field of Classification Search
CPC ............ H01S 3/06745; H01S 3/06706; H01S 3/08018; G02B 6/036
USPC ......................... 359/341.1, 346; 385/126, 128
See application file for complete search history.

(56) References Cited

U.S. PATENT DOCUMENTS

| | | |
|---|---|---|
| 3,505,046 A | 4/1970 | Phaneuf |
| 4,046,537 A | 9/1977 | Deserno et al. |

(Continued)

FOREIGN PATENT DOCUMENTS

| | | |
|---|---|---|
| RU | 2176840 C2 | 12/2001 |
| WO | WO 92/10014 | 6/1992 |

(Continued)

OTHER PUBLICATIONS

Geshiro et al., "Truncated parabolic-index fiber with minimum mode dispersion," *IEEE Trans. on Microw. Theory Techn.*, 26:115-119 (1978).

(Continued)

*Primary Examiner* — Mark Hellner
(74) *Attorney, Agent, or Firm* — Klarquist Sparkman, LLP

(57) ABSTRACT

Fiber amplifiers and oscillators include tapered waveguides such as optical fibers that permit multimode propagation but produce amplification and oscillation in a fundamental mode. The tapered waveguides generally are provided with an active dopant such as a rare earth element that is pumped with an optical pump source such as one or more semiconductor lasers. The active waveguide taper is selected to taper from a single or few mode section to a multimode section, and seed beam in a fundamental mode is provided to a section of the waveguide taper associated with a smaller optical mode, and an amplified beam exits the waveguide taper at a section associated with a larger optical mode.

13 Claims, 5 Drawing Sheets

(56) References Cited

U.S. PATENT DOCUMENTS

| | | |
|---|---|---|
| 4,072,399 A | 2/1978 | Love |
| 4,179,185 A | 12/1979 | Hawk |
| 4,773,924 A | 9/1988 | Berkey |
| 4,818,062 A | 4/1989 | Scifres et al. |
| 5,011,251 A | 4/1991 | Miller et al. |
| 5,017,206 A | 5/1991 | Miller et al. |
| 5,153,932 A | 10/1992 | Blyler, Jr. et al. |
| 5,239,176 A | 8/1993 | Stevenson |
| 5,259,046 A * | 11/1993 | DiGiovanni et al. ........... 385/12 |
| 5,295,210 A | 3/1994 | Nolan et al. |
| 5,295,211 A | 3/1994 | Weidman |
| 5,408,554 A | 4/1995 | Cryan et al. |
| 5,448,673 A | 9/1995 | Murphy et al. |
| 5,461,692 A | 10/1995 | Nagel |
| 5,568,318 A | 10/1996 | Leger et al. |
| 5,579,422 A | 11/1996 | Head et al. |
| 5,629,997 A | 5/1997 | Hardy |
| 5,664,037 A | 9/1997 | Weidman |
| 5,668,903 A | 9/1997 | Neuberger et al. |
| 5,715,270 A | 2/1998 | Zediker |
| 5,729,643 A | 3/1998 | Hmelar et al. |
| 5,734,766 A | 3/1998 | Flint |
| 5,745,284 A | 4/1998 | Goldberg et al. |
| 5,818,630 A | 10/1998 | Fermann et al. |
| 5,825,803 A | 10/1998 | Labranche |
| 5,864,644 A | 1/1999 | DiGiovanni et al. |
| 5,867,305 A | 2/1999 | Waarts et al. |
| 5,873,923 A | 2/1999 | DiGiovanni |
| 5,887,097 A | 3/1999 | Henry et al. |
| 5,935,288 A | 8/1999 | DiGiovanni et al. |
| 5,949,932 A | 9/1999 | Lawrenz-Stolz |
| 6,031,953 A | 2/2000 | Rekow et al. |
| 6,044,096 A | 3/2000 | Wolak et al. |
| 6,078,716 A | 6/2000 | Huang et al. |
| 6,101,199 A | 8/2000 | Wang et al. |
| 6,134,362 A | 10/2000 | Au-Yeung et al. |
| 6,198,858 B1 | 3/2001 | Pan et al. |
| 6,272,268 B1 | 8/2001 | Miller et al. |
| 6,278,816 B1 | 8/2001 | Keur et al. |
| 6,292,608 B1 | 9/2001 | Toh |
| 6,373,868 B1 | 4/2002 | Zhang |
| 6,385,371 B1 | 5/2002 | Li |
| 6,397,636 B1 | 6/2002 | DiGiovanni et al. |
| 6,404,954 B1 | 6/2002 | Zhu et al. |
| 6,421,489 B1 | 7/2002 | Berkey et al. |
| 6,434,295 B1 | 8/2002 | MacCormack et al. |
| 6,434,302 B1 | 8/2002 | Fidric et al. |
| 6,477,295 B1 | 11/2002 | Lang et al. |
| 6,496,301 B1 | 12/2002 | Koplow et al. |
| 6,516,124 B2 | 2/2003 | Po |
| 6,532,244 B1 | 3/2003 | Dewey et al. |
| 6,608,951 B1 | 8/2003 | Goldberg et al. |
| 6,666,590 B2 | 12/2003 | Brosnan |
| 6,668,112 B1 | 12/2003 | Kaneda |
| 6,700,709 B1 | 3/2004 | Fermann |
| 6,731,837 B2 | 5/2004 | Goldberg et al. |
| 6,778,732 B1 | 8/2004 | Fermann |
| 6,816,652 B1 | 11/2004 | Lin et al. |
| 6,868,236 B2 | 3/2005 | Wiltsey et al. |
| 6,907,163 B2 | 6/2005 | Lewis |
| 6,956,876 B1 | 10/2005 | Aquaro et al. |
| 6,970,624 B2 | 11/2005 | DiGiovanni et al. |
| 6,990,278 B2 | 1/2006 | Vakili et al. |
| 7,016,573 B2 | 3/2006 | Dong et al. |
| 7,046,432 B2 | 5/2006 | Starodoumov |
| 7,046,875 B2 | 5/2006 | Gonthier et al. |
| 7,209,615 B2 | 4/2007 | Fishteyn |
| 7,221,822 B2 | 5/2007 | Grudinin et al. |
| 7,236,671 B2 | 6/2007 | Rasmussen |
| 7,272,956 B1 | 9/2007 | Anikitchev et al. |
| 7,327,920 B2 | 2/2008 | Dong et al. |
| 7,336,872 B1 | 2/2008 | Malo |
| 7,420,996 B2 | 9/2008 | Schulte et al. |
| 7,436,868 B2 | 10/2008 | Schulte et al. |
| 7,437,046 B2 | 10/2008 | DiGiovanni et al. |
| 7,443,895 B2 | 10/2008 | Schulte et al. |
| 7,526,165 B2 | 4/2009 | Nielsen et al. |
| 7,532,792 B2 | 5/2009 | Skovaard et al. |
| 7,539,377 B2 | 5/2009 | Gonthier |
| 7,561,769 B2 | 7/2009 | Fujimoto et al. |
| 7,574,087 B2 | 8/2009 | Inoue et al. |
| 7,586,963 B2 | 9/2009 | Schulte et al. |
| 7,606,452 B2 | 10/2009 | Bilodeau et al. |
| 7,637,126 B2 | 12/2009 | Koeppler et al. |
| 7,729,574 B2 | 6/2010 | Moriarty |
| 7,760,978 B2 | 7/2010 | DiGiovanni et al. |
| 7,787,733 B2 | 8/2010 | DiGiovanni et al. |
| 7,957,432 B2 | 6/2011 | Seo et al. |
| 7,991,255 B2 | 8/2011 | Salokative |
| 8,068,705 B2 | 11/2011 | Gapontsev et al. |
| 8,213,070 B2 | 7/2012 | Koplow |
| 8,248,688 B2 | 8/2012 | Baird et al. |
| 8,346,038 B2 | 1/2013 | Gonthier |
| 8,433,168 B2 * | 4/2013 | Filippov et al. ................ 385/127 |
| RE44,262 E | 6/2013 | Gonthier et al. |
| 8,457,456 B2 | 6/2013 | Kopp et al. |
| 8,472,765 B2 | 6/2013 | Holland |
| 8,483,533 B1 | 7/2013 | Mehl |
| 8,498,046 B2 | 7/2013 | Dong et al. |
| 8,711,471 B2 | 4/2014 | Liu et al. |
| 2002/0172486 A1* | 11/2002 | Fermann ........................ 385/128 |
| 2003/0031442 A1 | 2/2003 | Siegman |
| 2004/0228593 A1 | 11/2004 | Sun et al. |
| 2005/0008044 A1* | 1/2005 | Fermann et al. ................ 372/19 |
| 2005/0041702 A1 | 2/2005 | Fermann et al. |
| 2005/0226286 A1 | 10/2005 | Liu et al. |
| 2005/0265653 A1 | 12/2005 | Cai et al. |
| 2005/0265678 A1 | 12/2005 | Manyam et al. |
| 2007/0062222 A1 | 3/2007 | Janka et al. |
| 2007/0086501 A1 | 4/2007 | Karlsen |
| 2007/0116071 A1 | 5/2007 | Schulte et al. |
| 2007/0116077 A1 | 5/2007 | Farmer et al. |
| 2007/0196062 A1 | 8/2007 | Inoue et al. |
| 2007/0237453 A1 | 10/2007 | Nielsen et al. |
| 2008/0050069 A1 | 2/2008 | Skovgaard et al. |
| 2008/0063348 A1 | 3/2008 | Kumano et al. |
| 2008/0166094 A1 | 7/2008 | Bookbinder et al. |
| 2008/0170823 A1 | 7/2008 | Gonthier |
| 2009/0003788 A1 | 1/2009 | Galvanauskas |
| 2009/0010286 A1* | 1/2009 | Messaddeq et al. ............. 372/6 |
| 2009/0060417 A1 | 3/2009 | Bilodeau et al. |
| 2009/0092365 A1 | 4/2009 | Donlagic |
| 2009/0136176 A1 | 5/2009 | Kopp et al. |
| 2009/0202204 A1 | 8/2009 | Nielsen et al. |
| 2010/0111118 A1 | 5/2010 | Seo et al. |
| 2010/0142894 A1 | 6/2010 | Gonthier |
| 2010/0247047 A1 | 9/2010 | Filippov et al. |
| 2010/0278486 A1 | 11/2010 | Holland |
| 2011/0032602 A1 | 2/2011 | Rothenberg |
| 2011/0032603 A1 | 2/2011 | Rothenberg |
| 2011/0032604 A1 | 2/2011 | Rothenberg et al. |
| 2011/0058250 A1 | 3/2011 | Liu et al. |
| 2011/0069723 A1 | 3/2011 | Dong et al. |
| 2011/0100066 A1 | 5/2011 | Bohme et al. |
| 2011/0157671 A1 | 6/2011 | Koplow |
| 2011/0305250 A1 | 12/2011 | Chann et al. |
| 2012/0127563 A1 | 5/2012 | Farmer et al. |
| 2012/0219026 A1 | 8/2012 | Saracco et al. |
| 2012/0230352 A1 | 9/2012 | Minelly et al. |
| 2012/0262781 A1 | 10/2012 | Price et al. |
| 2013/0287338 A1 | 10/2013 | Majid et al. |
| 2014/0119694 A1 | 5/2014 | Abedin et al. |

FOREIGN PATENT DOCUMENTS

| | | |
|---|---|---|
| WO | WO 97/42533 | 11/1997 |
| WO | WO 2005/022705 | 3/2005 |
| WO | WO 2009/043968 | 4/2009 |

(56) References Cited

FOREIGN PATENT DOCUMENTS

| WO | WO 2011/066440 | 6/2011 |
|---|---|---|
| WO | WO 2013/102033 | 7/2013 |

OTHER PUBLICATIONS

Geshiro et al., "Analysis of wave modes in slab waveguide with truncated parabolic index," *IEEE J. Quantum Electron.*, 10:647-649 (1974).

nLIGHT Corporation, "nLIGHT Introduces New Line of All Fiber Mode Field Tapers" Jan. 23, 2009 News Release, http://nlight.net/new/releases/92~nLIGHT-Introduces-New-Line-of-All-Fiber-Mode-Field, downloaded Jan. 18, 2014.

nLIGHT, spreadsheet listing order dates for tapers.

Niels Asger Mortensen, "Air-clad fibers: pump absorption assisted by chaotic wave dynamics?," *Optics Express*, 15:8988-8996 (Jul. 5, 2007).

Jauregui et al., "All-Fiber Side Pump Combiner for High Power Fiber Lasers and Amplifiers," Proc. of SPIE, 7580:75801E-1-75801E-8 (2010).

"Pump and Signal Taper for Airclad Fibers Final Report," Air Force Research Laboratory, 8 pages (May 1, 2006).

Eidam et al., "Femtosecond fiber CPA system emitting 830 W average output power," Opt. Lett. 35, 94-96 (2010).

Russbueldt et al., "400 W Yb:YAG Innoslab fs-amplifier," Opt. Express 17, 12230-12245 (2009).

Stolzenburg et al., "Picosecond Regenerative Yb:YAG Thin Disk Amplifier at 200 kHz Repetition Rate and 62 W Output Power," in *Advanced Solid-State Photonics*, OSA Technical Digest Series (CD) (Optical Society of America, 2007), paper MA6 (3 pgs.).

International Search Report from PCT Publication No. PCT/US2013/077242, 2pp. (dated May 22, 2014).

International Search Report from PCT Publication No. PCT/US2013/077243, 2pp. (dated Apr. 17, 2014).

Written Opinion from PCT Publication No. PCT/US2013/077242, 4pp. (dated May 22, 2014).

Written Opinion from PCT Publication No. PCT/US2013/077243, 4pp. (dated Apr. 17, 2014).

International Search Report from PCT Application No. PCT/US2012/072003, issued Mar. 27, 2013, 2 pp.

Written opinion from PCT Application No. PCT/US2012/072003, issued Apr. 4, 2013, 3 pp.

International Search Report from International Application No. PCT/US2013/030569, dated Jul. 4, 2013, 3 pp.

Written Opinion from International Application No. PCT/US2013/030569, dated Jul. 4, 2013, 5 pp.

\* cited by examiner

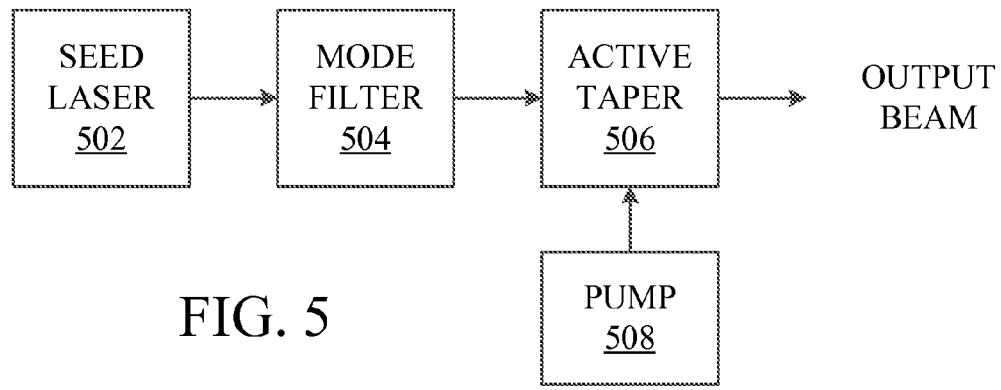
FIG. 5
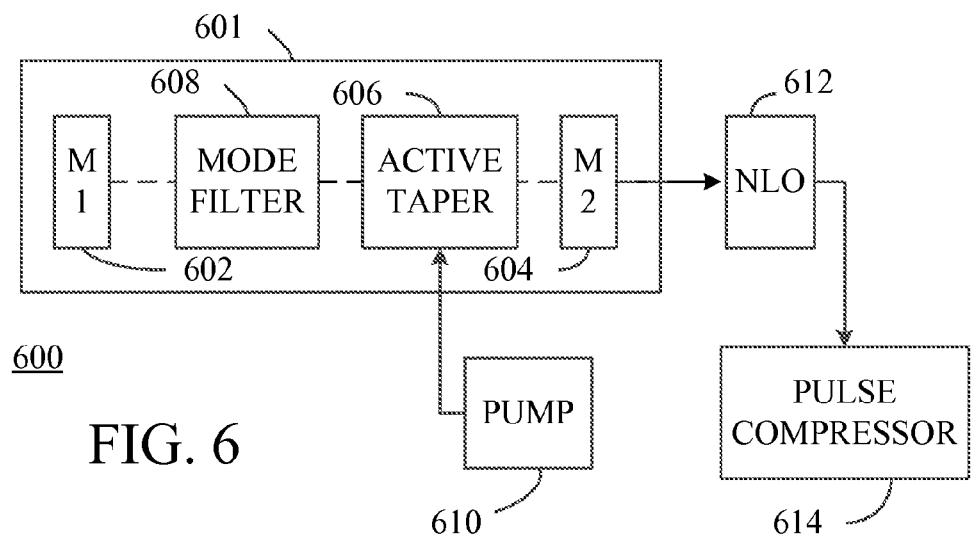
FIG. 6
FIG. 7
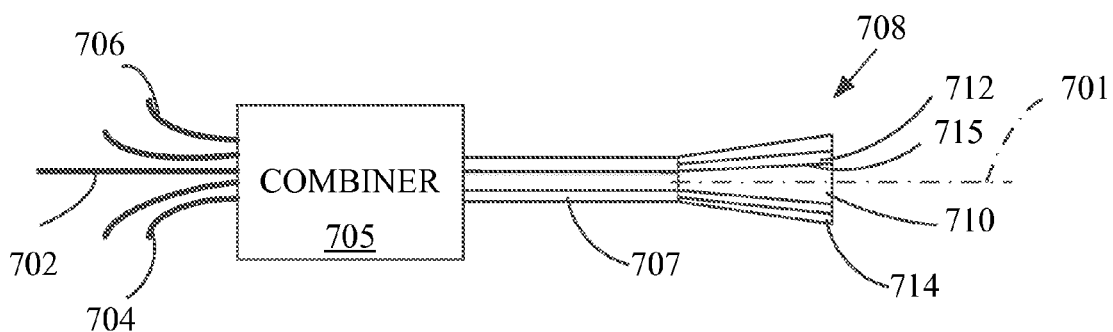

ACTIVE TAPERS WITH REDUCED NONLINEARITY

CROSS REFERENCE TO RELATED APPLICATIONS

This application is a continuation-in-part of U.S. patent application Ser. No. 12/757,737, filed Apr. 9, 2010 now U.S. Pat. No. 8,711,471, which is a continuation of U.S. patent application Ser. No. 12/545,791, filed Aug. 21, 2009 now abandoned, which claims the benefit of U.S. Provisional Patent Application No. 61/090,854, filed Aug. 21, 2008, all of which are incorporated herein by reference.

FIELD

The disclosure pertains to fiber amplifiers and oscillators that include tapered waveguides that permit multimode propagation but produce amplification and oscillation in a fundamental mode.

BACKGROUND

Over the past twenty years, rare earth (RE) doped optical fibers have had a tremendous impact on the laser industry. The first application that deployed a significant volume of rare earth doped optical fiber based devices was optical amplification in the telecommunications industry. In this application, optical signals carrying data are sent through single mode fiber typically at a wavelength near 1.5 µm. As these signals propagate over long distances, they are attenuated due to scattering and absorption losses in the transmission fiber. By coupling these transmission fibers to a section of erbium doped fiber that is pumped with a wavelength near 980 nm or 1480 nm, these signals can be amplified back to their original intensity level. These devices are commonly known as erbium doped fiber amplifiers (EDFAs).

When compared with other lasers and optical amplifiers, fiber based devices typically offer higher gain and higher overall efficiency. As the average power levels, pulse energies and peak powers of fiber lasers and fiber amplifiers continue to increase, rare earth doped optical fibers have begun to be used in a far broader range of applications. These applications are found in the medical, industrial, defense, and semiconductor processing industries.

Increasing the average power of fiber lasers can be limited by the brightness of laser diode pumps, the ability to couple power into fiber, and nonlinear effects caused by high optical power. These issues can be effectively addressed using fibers with large core sizes.

The fundamental transverse mode of an optical fiber has very desirable characteristics in terms of beam shape, minimum beam expansion during propagation through free space (often referred to as "diffraction limited") and optimum focusability. As a result, most applications benefit greatly from single mode, or fundamental mode operation of fiber lasers and amplifiers. As the core size of an optical fiber is increased to enable greater pulse energies and higher peak powers, the fiber begins to support the propagation of more than one transverse optical mode. The number of modes supported by an optical fiber can be roughly calculated by using the fiber's so-called V-number. The V-number of a fiber is defined as $V=2\pi a/\lambda NA$, wherein a is the radius of the fiber core and NA is the numerical aperture of the core. The number of modes supported by the fiber is then given by roughly one half the square of the V-number. It can be shown that a fiber with a V-number less than about 2.4 supports the propagation of only the fundamental mode.

Prior methods of increasing the peak and average powers of multimode amplifiers are described in Fermann et al., U.S. Pat. No. 5,818,630, which is incorporated herein by reference. A diffraction limited seed source is optically coupled to a multi-mode fiber amplifier. Through the use of a mode-converter, defined as either a set of bulk lenses or a tapered section of fiber, the beam size is changed to match as nearly as possible that of the fundamental mode of the optical fiber. If this is done well and the fiber is not disturbed, this approach can result in near fundamental mode operation of a multi-mode fiber amplifier. However, for the following three reasons, this approach has limited utility in practical applications. First, most seed lasers cannot be effectively coupled into only the fundamental mode of a multimode fiber. Even if the seed laser is a single transverse mode laser, unless the seed laser is a fiber laser, the fundamental mode of the seed laser is not the same as the fundamental mode of an optical fiber. For this reason, even with such a mode converter, higher order modes of the multimode optical fiber will be excited to some extent. Further, any changes in launch conditions due to, for example, movement or temperature changes can alter coupling of seed power into each of the numerous optical modes of the fiber. This causes corresponding changes in output beam shape and mode quality. In addition, when higher order modes are excited in a multimode fiber, the output beam shape and mode quality is highly sensitive to both micro and macro bends in the fiber. The presence of higher order modes can also result in poor beam pointing stability. Even if a stable package could be developed to prevent changes in micro and macro bending of the fiber during operation, this bend sensitivity makes manufacturing challenging as the output is not stable. These limitations largely render this amplifier configuration impractical for most commercial applications when not coupled with other mode control techniques.

In other approaches, tightly coiled fibers are used to suppress higher order modes. This approach results in a distributed bend induced loss that strips the power from the higher order modes in the amplifier. The induced loss is a relatively strong function of the spatial order of the fiber mode. For modes that are radially symmetric, the loss is independent of the axis of the coil with higher order modes experiencing higher loss. For modes that are radially asymmetric, the loss is dependent on the axis of the coil. To ensure sufficient loss for all modes, it is therefore sometimes required to coil the fiber about one axis follow by a coil on an axis oriented at 90 degrees with respect to the first one. Amplifiers made in this way can be designed to operate stably in only the fundamental mode.

Unfortunately, there are also other practical limitations associated with this design as well. One limitation is that to strip the higher order modes effectively, loss is also created for the fundamental mode. This distributed loss for the fundamental mode potentially limits the overall efficiency of the fiber amplifier. Another limitation is that as the fiber is bent, the effective mode area of the fundamental beam is reduced. This increases the irradiance of the signal within the fiber and, as described earlier, leads to increased amounts of nonlinear effects. These nonlinear effects ultimately limit the peak power capability of the fiber amplifier.

A significant improvement is described by Filippov et al., U.S. Patent Application Publ. 2010/0247047, disclose using a single-mode fiber as the rare earth doped amplifying region in a continuous wave (CW) laser cavity. A high beam quality can be achieved based on a taper having a smallest cross sectional dimension that permits only single mode propagation. This approach, although demonstrated to have a high beam quality, lacks in efficiency and power scaling capability for the following reasons. The single-mode portion at the smaller end of the taper restricts the core size to a value enabling a V-number of less than 2.4. In order to increase the peak and average power with high efficiency (i.e. to not lose pump power due to vignetting) the corresponding pump waveguide, i.e., the cladding size of the single-mode portion is restricted by the available pump brightness at the required pump power level. Therefore to increase the peak and average power, the single-mode cladding diameter needs to be increased. This leads to a lower core/cladding area ratio, which subsequently reduces pump absorption and makes the amplifier longer, thus inherently lowering the nonlinear threshold of the system, preventing further power scaling of high peak power, high average power, and/or spectrally narrow pulses.

In view of the above, further improvements in peak and average power of pulsed fiber lasers require an improved waveguide design.

SUMMARY

Disclosed herein are methods, apparatus, and systems that can reduce nonlinearities in high power fiber lasers and amplifiers while preserving optical beam quality. Waveguides such as optical fibers can provide a large mode area with a variable or increasing core size so as to reduce optical intensities, thereby reducing optical nonlinearities. A tapered waveguide such as an optical fiber having a tapered core can be provided with a rare earth or other active dopant. Such an active taper can be configured as part of an optical amplifier that increases optical power of an input beam propagating along an axis of the active taper. The taper of the waveguide can be configured so that optical mode area increases along the taper axis. In this way, optical intensity (power/area or irradiance) increases less rapidly than optical power, thereby tending to reduce the effects of nonlinearities. For example, such an active taper can be used to amplify a seed optical beam that is directed along the axis of the taper. If the amplifier provides a total gain $g(z)$ that is a function of a propagation distance $z$ along the axis of the active taper, for an input seed of power $P_0$, an input mode field diameter of $A(0)$, and an input intensity of $P_0/A(0)$ the amplified power is $P_0 g(z)$ and the amplified intensity is $P_0 g(z)/A(z)$, wherein $A(z)$ is a mode area. Thus, while seed power increase as $g(z)$, seed intensity increases only as $A(0)/A(z)$.

An active taper can be configured to provide a relatively large mode area for a lowest order mode or other mode at both an input and output of the active taper. In some examples, the input defines a few mode fiber. The active taper can include a variable mode core that has a cross-section, diameter or other dimension that can increase, decrease, or otherwise vary arbitrarily, but typical variations are adiabatic. Variable mode cores are cores that can support varying numbers of modes as well as cores that support a fundamental mode at different diameters. Cross-sectional areas or core dimensions can vary according to a variety of functions such as linear, logarithmic, or hyperbolic tangent functions, or an error function. In addition, any non-tapered portions of an active taper prior having relatively small dimensions are preferably short so that a substantial portion of the active taper has a relatively large core size. An active taper can be coupled or spliced to large mode area fibers of compatible optical characteristics. By exciting only the fundamental mode of the low nonlinearity active taper, stable single-mode amplification can be achieved.

Active tapers can be situated for either co-propagation pumping or counter-propagation pumping. Fiber or free space optical components can be built using the low nonlinearity active taper such as active combiner or free space multiplexer to counter pump the amplifier.

The core of the low nonlinearity active taper can also be confined doped in order to achieve better beam quality conservation than that typically of fully doped cores. Confined doping significantly reduces the higher order mode content as such modes tend to have lower gain than the fundamental mode throughout their propagation in the taper. In addition, confined doping can result in better overlap of the fundamental mode with the fiber gain.

In some examples, active tapers include a variable mode core doped with an active rare earth dopant and extending along a taper axis. An inner cladding is situated about the variable mode core, the inner cladding having an average refractive index lower than an effective refractive index of the variable mode core. An outer cladding is situated about the inner cladding, the outer cladding having a refractive index lower than the refractive index of the inner cladding. In typical examples, the variable mode core has a core diameter that changes monotonically or non-monotonically along the taper axis. In representative embodiments, the variable mode core includes an input section in which the variable mode core is a few mode core or a single mode core and an output section in which the variable mode core is a multimode core. In some embodiments, the variable mode core has a core diameter $d_{core}$ that is a function of position along the taper axis, and the dopant in the variable mode core is confined to a diameter that is less than 0.99. 0.95, 0.9, 0.8, 0.6, or 0.5 $d_{core}$ or extends throughout the core. In typical examples, the variable mode core has a first section in which a core diameter increases monotonically, and a second section coupled to the first section in which the variable mode core diameter decreases monotonically, and the first section and the second section are adjacent. In additional examples, a smallest core diameter of the first section is adjacent a smallest core diameter of the second section.

In representative active tapers, a ratio of a diameter of the variable mode core to a diameter of the inner cladding and the outer cladding is constant along the taper axis. In particular examples, at least one of the inner cladding and the outer cladding has a variable refractive index so as to decrease an effective refractive index of the variable mode core. In other examples, at least two stress elements such as stress rods are configured to produce birefringence in the variable mode core. In other alternatives, the variable mode core and the inner and outer claddings have circular cross sections, or the variable mode core is a birefringent variable mode core. Some example active tapers include an outer layer of a polymer or metal on the outer cladding. In other examples, the outer cladding has a polygonal or D-shaped cross section.

Optical amplifiers comprise an active taper that includes a rare earth doped, variable mode core surrounded by at least an inner cladding. An optical pump is situated so as to direct pump optical radiation to at least a rare earth doped portion of the variable mode core. A mode filter is coupled to the active taper, and situated so as to receive an input optical signal and deliver a mode filtered optical signal to the variable mode core. In some embodiments, the active taper includes an outer cladding about the inner cladding, and the variable mode core and the inner and outer claddings have circular cross-sections. In representative examples, at least a portion of the pump radiation is coupled to the rare earth doped portion of the core from the inner cladding, and the optical pump includes at least one semiconductor laser, a fiber laser, or other laser. Typically, the variable mode core has a few mode portion situated so as to receive the mode filtered optical signal, and the mode filtered optical output has a mode profile corresponding to a mode profile associated with a few mode portion. In some examples, the rare earth dopant in the variable mode core is confined to a diameter of less than 0.8 times the variable mode core diameter. In other examples, the active taper is a polarization dependent active taper. In alternative embodiments, the polarization dependent active taper includes at least one of an elliptical variable mode core or the inner cladding includes at least two stress elements configured to produce birefringence in the variable mode core. In other examples, the variable mode core has a monotonically increasing core diameter along the axis. In other examples, a cladding is situated about the variable mode core having a refractive index profile selected to decrease the effective refractive index of the variable mode core.

Optical amplifier systems comprise an optical resonator defining an optical cavity having an axis and a rare earth doped variable mode core situated in the optical cavity along the axis. An optical mode controller is situated in the optical cavity along the axis and configured to attenuate higher order modes associated with the variable mode core. In some examples, at least one seed laser is situated so as to direct a seed beam along the axis. In typical examples, the seed laser is configured to provide a seed beam propagating substantially in a lowest order mode of the rare earth dope variable mode core, and the seed beam has a wavelength corresponding to gain bandwidth of the rare earth variable mode core. In some embodiments, an inner cladding and an outer cladding are situated about the rare earth doped variable mode core. The optical cavity can be defined by a first reflector and a second reflector, or at least one fiber Bragg grating, dielectric mirror, or a fiber end facet. In some examples, the optical cavity is a polarization dependent optical cavity. In additional examples, a non-linear optical element and/or a pulse compressor is situated to receive an optical output from the optical cavity.

These and other features and advantages of the disclosed technology will be apparent from the following detailed description and the accompanying drawings.

BRIEF DESCRIPTION OF THE DRAWINGS

FIG. 5 is a schematic diagram of a representative optical amplifier that includes a variable mode active taper.

FIG. 6 is a schematic diagram of a representative laser system that includes a variable mode active core.

FIG. 7 is a sectional view of an active taper configured for co-propagating pump radiation.

DETAILED DESCRIPTION

Figure 1:
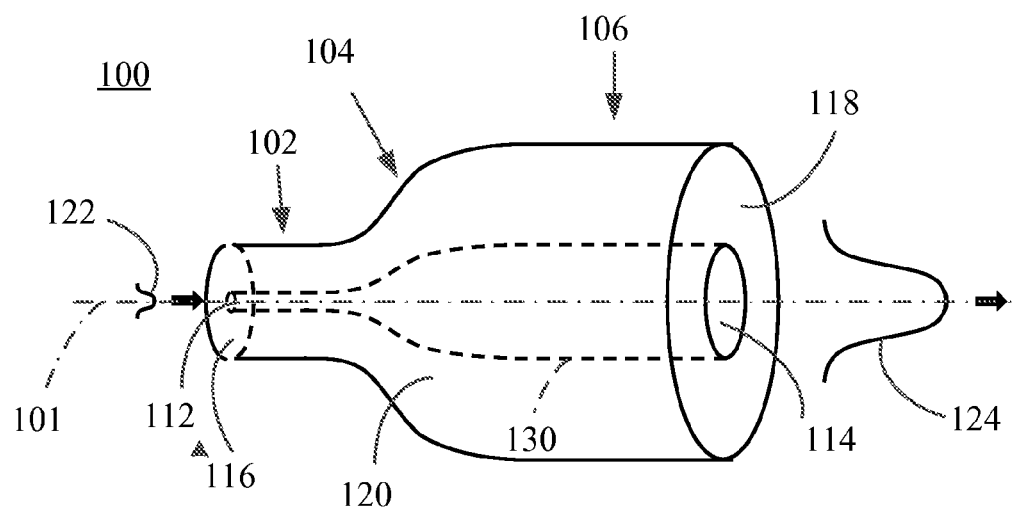
FIG. 1 is a perspective view of an active taper that includes a few mode input section.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Propagation in circularly symmetric dielectric optical waveguides such as optical fibers is described in some representative examples. Fibers are generally based on refractive index differences between a fiber core and one or more fiber claddings. In some examples, double or triple clad fibers can be used, in which a single mode (or few mode) core is situated within an inner clad, and one or more outer claddings. However, other waveguides can be used such as hollow waveguides or photonic crystal waveguides, and waveguides need not be symmetric. In some examples, polarization retaining optical fibers can be used which typically are asymmetric in order to maintain polarization of input optical signals.

For convenience, propagation in an optical fiber or other flexible waveguide is described with reference to a propagation axis that follows waveguide curvature, and need not be a straight line axis. As used herein, a variable mode core refers to a core of a waveguide such as an optical fiber that is configured to support different numbers of propagating modes along an axis of the waveguide. For example, a variable mode core can vary so as to be a single mode core, a few mode core, or a variable mode core as a function of position. A variable mode core (or a cladding) can be doped with an active dopant such as a rare earth element. For example, one or more of holmium, bismuth, erbium, ytterbium, neodymium, dysprosium, praseodymium, and thulium can be used as a dopant. Dopant can be provided throughout a core or cladding or can be confined to a particular portion of the core or cladding. As used herein, a confined doping refers to a core doping with active ions within a portion of a core that is less than the full core diameter or effective cross-sectional area, and typically restricted to a volume defined by a diameter or effective diameter that is less than about 0.2, 0.4, 0.5, 0.75, 0.8, 0.9, 0.95, or 0.99 times the core diameter or core effective diameter. In some examples, active ion dopant extends throughout the core. For convenience, an effective diameter is a diameter associated with a circular cross-section having the same area as the core cross-sectional area. As used herein, pump radiation is optical radiation at wavelengths suitable to produce optical gain in a doped core and seed radiation is radiation at wavelength within a gain bandwidth of a pumped, doped core. Waveguides are generally described herein with reference to optical fibers having circular cross-sections, but arcuate, elliptical, polygonal, D-shaped, or other cross-sections can be used. In addition, a cross-section of a cladding can have such cross-sections as well. Fibers that support a few modes are used and are referred to herein as "few mode" fibers. Such fibers have a normalized frequency parameter (V-number) defined as V=$(2\pi a/\lambda)(n_{core}^2-n_{clad}^2)^{1/2}$, wherein $\lambda$ is vacuum wavelength, a is a fiber core radius, and $n_{core}$, $n_{clad}$ are fiber core and fiber cladding refractive indices, respectively. A total number M of modes supported by a fiber is M=$4V^2/\pi^2$. For single mode fibers, V is less than about 2.405. As used herein, a few mode fiber is defined as a fiber for which a V-number is less than about 2.5, 3, 3.5, 4, 4.5, 5, 7.5, or 10, and in typical examples, few mode fibers have 30 or fewer modes. In other examples, multimode fibers can be used. Typically core diameters for single mode fibers range from about 2 to 100 μm, about 3 to 25 μm, or about 5 to 12 μm, and cladding diameters range from about 25 to about 1000 μm. In some examples, fibers are based on a step in refractive index between a core and a cladding. In other examples, fibers are defined by providing air holes (typically arranged in an array) in a dielectric material to form so-called photonic crystal fibers. Using holes in this way permits small refractive index differences, permitting single mode fibers to have large mode field diameters. Tapers and active tapers can be provided in these and other types of waveguides.

In some examples, so-called double clad and/or double core fibers are used. A double clad fiber typically includes a core, an inner cladding, and an outer cladding. The core is typically selected to define a single mode (or few mode) waveguide, while the inner cladding defines a multimode core. Generally, a refractive index difference between the inner cladding and the outer cladding is relatively large so that a numerical aperture of the multimode waveguide defined by the inner and outer claddings can be large. A double core fiber typically includes a first (inner) core, a second (outer) core, and an outer cladding. The first core is selected to define a single mode (or few mode) waveguide prior to any tapering. The second core is selected to define a single mode (or few mode) waveguide after tapering. Generally refractive index differences between first core, second core, and outer cladding are relatively small. In other examples, triple clad fibers are used having a glass or silica outermost cladding to provide superior operation at elevated temperatures.

As defined herein, a tapered core is a core of an optical fiber or other waveguide extending along a propagation axis and having a variable cross section along the axis. A tapered core can have a monotonically increasing or decreasing core cross-section or other dimension. In some examples, tapered cores permit propagation of one, a few, or many optical modes at different locations along the tapered core. As used herein, an effective tapered core refers to a core of an optical fiber or other waveguide in which a cladding dimension or cladding refractive index varies so as to produce an associated variation of modes that propagate in the core. In addition, an effective tapered core also refers to a core in which a core refractive index varies so as to produce an associated variation of modes that propagate in the core. An outside diameter of a fiber or other waveguide that includes a tapered core can be constant or variable, and can have a similar or different cross section than a core or cladding.

A taper length is generally selected based on pump radiation absorption as determined by core to cladding area ratio, dopant concentration, and absorption cross section at a pump wavelength of interest. Dopant concentrations are generally selected to provide absorption of pump radiation that can be characterized by loss per unit length. Typical values are between about 1 dB/m and 100 dB/m for pump radiation at or near an absorption maximum associated with a particular dopant. Pump radiation is typically directed into one or more claddings and then coupled to and absorbed in a doped core.

In some disclosed examples, active tapers are of one piece, monolithic construction such by drawing a taper precursor or preform. Active tapers can also be formed by splicing or otherwise connecting one or more fibers or fiber tapers.

Theoretical Background

A key concern in amplifying temporally short pulses is the nonlinear threshold of the amplifying media. The thresholds for stimulated Brillouin and Raman scattering can be expressed with a generalized equation:

$$\text{Threshold} \propto C_{NL}\frac{A_{\it eff}}{L_{\it eff}}\frac{1}{g_{NL}},$$

wherein $C_{NL}$ is a nonlinear coefficient (Brillouin or Raman), $A_{\it eff}$ is an effective area of the signal, $L_{\it eff}$ is an effective amplifier length, and $g_{NL}$ is a nonlinear gain (Brillouin or Raman). The ratio $A_{\it eff}/L_{\it eff}$ ratio of the waveguide should be maximized or made as large as practical in order to permit high peak and average power operation or otherwise provided enhanced amplification while suppressing nonlinear effects.

The effective length of an amplifier such as a double clad fiber amplifier is mainly defined by the pump absorption properties of the waveguide. If the pump is assumed to be multimoded and coupled to the cladding, cladding absorption can be characterized with an absorption coefficient a that can be conveniently expressed in units of dB/m. In typical examples, an effective length can be defined by a pump absorption for a specific application and the pump absorption selected as preferred. Generally, an effective fiber length $L_{\it eff}$ is associated with total pump power absorption, and thus $L_{\it eff}$ is proportional to $1/\alpha$. Absorption of pump radiation propagating in a cladding is based on an overlap of the multimode-propagating pump radiation in the cladding and the rare earth doped core, i.e. by the ratio of the core/cladding areas, so that $$\alpha \propto \left(\frac{d_i}{\phi_i}\right)^2,$$

wherein $d_i$ is a taper input core diameter and $\phi_i$ is a taper input cladding diameter. In some examples, this ratio in constant along a taper axis, but core and cladding diameters can vary independently. Pump brightness (or radiance) is generally limited by the current state of pump source technology (for example, the availability of high power, high brightness semiconductor lasers or other sources), and therefore $\phi_i$ is proportional to the achievable pump brightness, which at any given time is constant. Thus, the optimized absorption $\alpha_{opt}$ and the effective length of an active taper scale as $$\alpha_{opt} \propto d_i^2 \Rightarrow L_{\mathit{eff}} \propto \frac{1}{d_i^2}.$$

In a large mode area active taper, the average effective area of the waveguide is between the effective area of the input and the effective area of the output. By simplifying, it can therefore be said, that $$A_{\mathit{eff}} \propto (d_i + d_o)^2,$$

wherein $d_o$ is the output diameter of the amplifier active taper core ($d_o > d_i$). The objective of the analysis was to maximize the nonlinear threshold of the active taper. To conclude, $$\text{Threshold} \propto \frac{A_{\mathit{eff}}}{L_{\mathit{eff}}} \propto d_i^2(d_i + d_o)^2.$$

Thus, to reduce nonlinearities in an active taper, the input core diameter $d_i$ should be made as large as possible. A core diameter associated with multimode or few mode propagation for the active taper permits increased peak and average power signal amplification. Second, while the output core diameter $d_o$ is of lesser importance, this diameter too should be large or maximized in so far as practical. Generally an active taper output core diameter is defined by, for example, practical manufacturing and fiber handling limitations. Third, the taper input cladding diameter $\phi_i$ is defined by the required pump power and available pump brightness.

In order not to limit the achievable average and peak powers, the core in the input and output of the active taper preferably supports few mode or multimode propagation, and core diameter variations along a core axes (longitudinal core diameter variations) are preferably adiabatic in order to obtain high efficiency and good beam quality. A mode filter or mode converter can be used to couple seed radiation to a pumped active taper so that the seed radiation excites only or primarily the fundamental mode of the active taper, thus preventing beam quality or efficiency degradation. As used herein, a mode filter preferably couples at least 50%, 60%, 75%, 90%, 95%, or 99% of a seed beam into a lowest order mode of an active taper.

Further enhancement of multimode active taper physical parameters can take into account modal coupling and subsequent beam quality degradation. Fermann et al., U.S. Pat. No. 5,818,630, which is incorporated herein by reference, discloses microbending induced mode coupling. Using the notation defined above, a mode coupling coefficient (D) according to Fermann can be expressed as:

$$D \propto \frac{d_{i,o}^8}{\phi_{i,o}^6 \lambda^4}.$$

In a waveguide having a predetermined $d/\phi$ ratio and a constant wavelength, an active taper typically exhibits decreased mode coupling, thus increasing the beam quality, in comparison to a fiber having a constant core diameter $d_o$ and a constant cladding diameter $\phi_o$.

An active taper that permits few or multimode propagation in the taper core at least at some locations can be coupled or spliced to, for example, a passive few mode or multimode fiber. If the passive fiber and the core of the active taper have similar mode field diameters (i.e., have similar numerical apertures and core diameters) at the coupling, only the fundamental mode of the active taper can be excited. Therefore, unless power is scattered out of the fundamental mode and into higher order modes, the amplifier operates as a fundamental mode amplifier with increased nonlinear threshold.

In representative examples, active waveguides such as active fibers are configured so that thresholds for nonlinear effects are increased because fiber core diameters in a taper reduce optical intensity. Bend induced losses tend to be reduced, so that optical amplifiers using active tapers can operate with increased efficiency. In addition, an active taper need not be tightly coiled, and exhibits little or no bend induced reduction in mode areas. Active taper output can be in a fundamental mode which is well suited for typical applications.

In optical amplifiers based on the disclosed active tapers, the active taper is situated so that core and/or cladding cross-sectional dimensions or areas increase from an input end to an output end. In some examples, a core/cladding dimensional ratio remains constant over some or all of a taper length. A transition region from a first to a second core area, diameter, or other dimension can be gradual or abrupt, and can be preceded or following by untapered sections. By positioning a small core area to large core area transition at or near a taper input, an amplified optical beam will propagate primarily in the larger core/cladding section of the taper, reducing nonlinearities that scale with irradiance. The length of the transition may be short or long, and typically is gradual enough that amplified optical beam continues to propagate in a lowest order mode. The taper can be based on one or more longitudinal profiles such as a linear profile, a logarithmic profile, an error function profile, or a hyperbolic tangent profile, or combinations these and other profiles. Transition lengths and longitudinal profiles can be selected in manufacturing of fiber tapers by selected a speed and acceleration during perform drawing. For example, a sudden change in draw speed (acceleration) corresponds to a relatively abrupt size change, while a slower change in draw speed will corresponds to a more gradual taper.

An active taper for an optical amplifier or oscillator can be co-pumped or counter pumped, or both. In a co-pumped amplifier, the pump propagates in the same direction as an input seed beam. The seed beam and pump radiation are coupled into the active taper at an input end. In a counter-pumped configuration, the pump propagates in a direction opposite to that of the seed optical beam. Counter-pumped amplifiers can exhibit nonlinear thresholds that are higher than those associated with co-pumped configurations. In typical examples, the seed optical beam is coupled into an active taper and propagates throughout the taper from a smaller core section to a larger core section. A passive fiber can be used to deliver the seed optical beam to the active taper, and can be spliced or otherwise coupled to the active taper. A passive fiber having a mode field diameter (MFD) that is the same or substantially the same as that of an input portion of the active taper input is preferred to conserve the (good) beam properties of the seed optical beam. The seed optical beam can also be coupled into the active taper using free space optics.

Pump radiation can be coupled in an active taper at a seed input (co-pumped) or at an output (counter pumped) using various techniques. For example, the pump can be coupled using a feed through (N+1):1 fiber multiplexer, allowing the seed beam and the pump radiation to be coupled into the active taper. A fiber multiplexer can also be used at a taper output for additional pumping. The feed through fiber is substantially continuous and can be selected so as have a MFD that corresponds to the taper input or output. Alternatively, the feed through fiber can be a passive or active fiber, or be included in an active taper. Free space optical devices or multiplexers can also be used to couple pump radiation at the taper input or output, but fiber based devices are generally more convenient.

Active tapers can also include polarization maintaining optical fibers. For example, stress rods can be provided in a preform used to produce the variable mode core or the active taper. In addition, the active taper core can be provided with a confined doping, and dopant need not extend to all portions of the core. Typically, confining doping to a more central region produces superior beam quality than a fully doped core because confined doping tends to reduce the gain of the higher order modes.

A representative actively doped taper 100 is illustrated in FIG. 1. The taper 100 includes a first fiber waveguide section 102 (also referred to as an input section), a tapered region 104, and a second fiber waveguide section 106 (also referred to as the output section). As shown in FIG. 1, the active taper is situated along an axis 101. The input section 102 and the output section 106 define an input core 112 and an output core 114 having respective core diameters $d_{in}$ and $d_{out}$, respectively. The taper 100 also includes a cladding 120 having input and output cladding diameters $D_{in}$ and $D_{out}$, respectively. For convenient illustration, only a single cladding is shown, but tapers can include one, two, or more claddings. In addition, protective buffer coatings are not shown in FIG. 1.

The tapered region 104 is associated with a varying core diameter that increases from $d_{in}$ to $d_{out}$ over the tapered region. A core/cladding interface 130 associated with the varying core diameter is shown as a smooth curve, and such a curve can be a simple linear taper, or a complex taper based on a preferred taper shape. Typically, a variation in core diameter per unit length is selected so that the taper is a so-called adiabatic taper and a single mode optical signal propagating in the input section 102 continues to propagate in a single, lowest order mode to the output section 106. As used herein, a taper slope is defined as change in core diameter per axial length, and an adiabatic taper in a single mode or few mode core is a taper having a taper slope that is less than about $\lambda/(n_{core}d_{core})$, or less than the core numerical aperture, wherein $n_{core}$ and $d_{core}$ are core refractive index and diameter, and $\lambda$ is an intended wavelength of use. One or more or both of a taper core or cladding can be provided with an active dopant such a rare earth dopant such as ytterbium, erbium, neodymium, praseodymium, thulium, samarium, holmium dysprosium, a transition metal, or a semiconductor. Taper lengths can be in a range of from about 0.1 cm to 25 m, 0.2 cm to about 2 m, 0.5 cm to about 1.5 m, or about 0.5 cm to about 10 cm, but longer or shorter tapers or tapered sections can be used. Typically, a fiber/taper combination has a total length of less than about 0.5 to 5 m.

The tapered region 104 exhibits increasing core and cladding diameters, and typically a ratio of core diameter to cladding diameter (d/D) remains approximately constant for fiber tapers formed using a preform having a constant diameter. As configured for use as an amplifier in which nonlinear effects are to be reduced, the active taper is configured so that an input signal propagates from an input end 116 to an output end 118, and an input mode field 122 increases in cross-sectional area as input beam irradiance or beam power increases. As shown in FIG. 1, the input mode field 122 and an output mode field 124 are preferably lowest order modes of the input section 102 and the output section 106, respectively.

Figure 2:
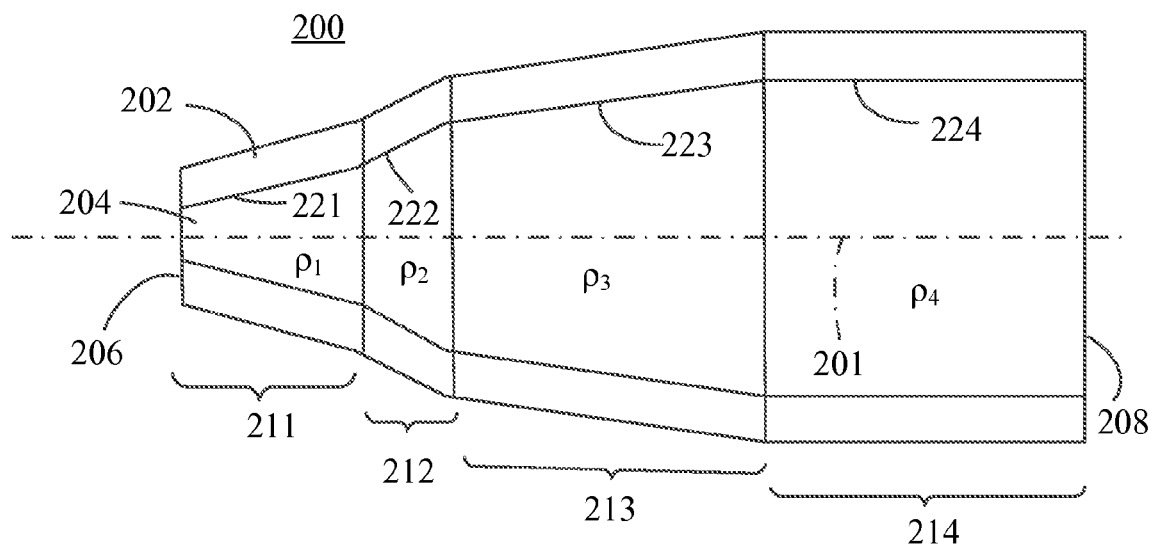
FIG. 2 is a sectional view of an active taper that includes a plurality of tapered sections and having a monotonic taper. The active taper can be formed in a single fiber or as a plurality of discrete tapered sections that are spliced together.

With reference to FIG. 2, a representative active taper fiber waveguide 200 includes a cladding 202 and a core 204 that extend along an axis 201 and are configured to define a step index fiber. In typical applications, an input optical beam is directed to an input surface 206 that is associated with a smaller core diameter so as to exit at an output surface 208. In the example of FIG. 2, the cladding 202 is shown as having a constant thickness and tapering diameter, but in other examples, the cladding thickness varies with changes in core diameter. The active taper 200 includes a plurality of sections 211-214, each which can have differing tapered core/cladding boundary profiles 221-224, respectively, and can have different core dopants, dopant concentrations $\rho_1$, $\rho_2$, $\rho_2$, $\rho_4$, dopant spatial distributions, or core or cladding refractive indices. As shown in FIG. 2, the section 214 has a zero slope taper 224, i.e., is untapered, while the sections 211-213 have differing tapers. For convenient illustration, the tapered boundaries 221-224 are shown as linear tapers, but each of the sections 211-214 can be different tapers that are based on linear or nonlinear tapers such as those based on logarithmic, polynomial, hyperbolic, or other functions. The tapered sections can be formed in a single fiber, or formed as discrete sections that are spliced together.

Figure 3:
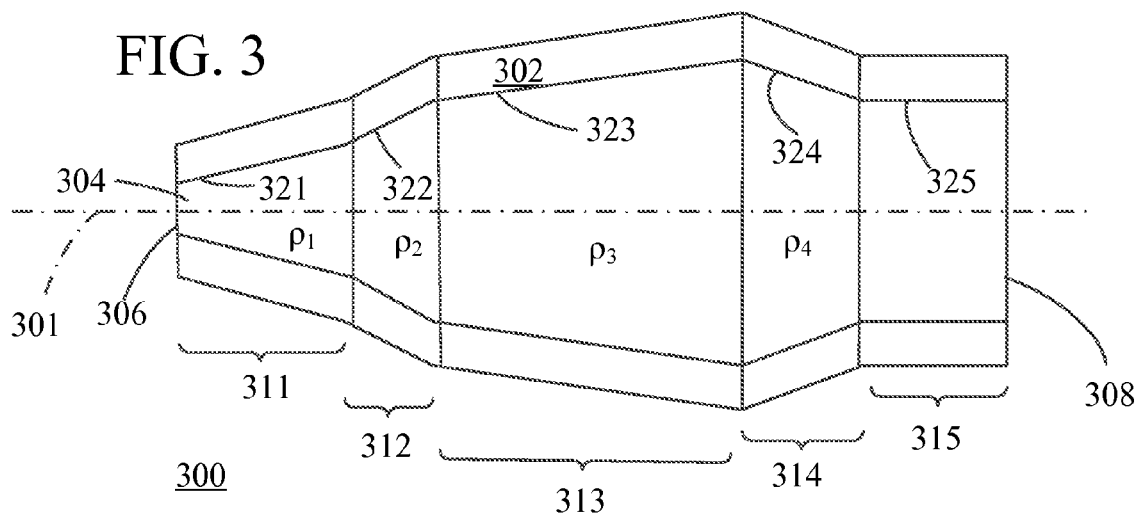
FIG. 3 is a sectional view of an active taper that includes a plurality of tapered sections and having non-monotonic taper.

With reference to FIG. 3, another representative active taper fiber waveguide 300 includes a cladding 302 and a core 304 that extend along an axis 301 and are configured to define a step index fiber. An input optical beam is typically directed to an input surface 306 that is associated with a smaller core diameter so as to exit at an output surface 308. The active taper 300 includes a plurality of sections 311-315, each which can have differing tapered core/cladding boundary profiles 321-325, respectively, and can have different core dopants, dopant concentrations, dopant spatial distributions, or core or cladding refractive indices. As shown in FIG. 3, the section 315 is untapered and undoped, while the sections 311-314 have differing tapers and respective dopant concentrations $\rho_1$, $\rho_2$, $\rho_2$, $\rho_4$. As noted above, tapered boundaries 321-325 are shown as linear tapers, but each can be based on one or more linear or nonlinear tapers such as those based on logarithmic, polynomial, hyperbolic, or other functions. In addition, the waveguide 300 can be formed in a single fiber or by splicing a plurality of sections together.

Figure 4:
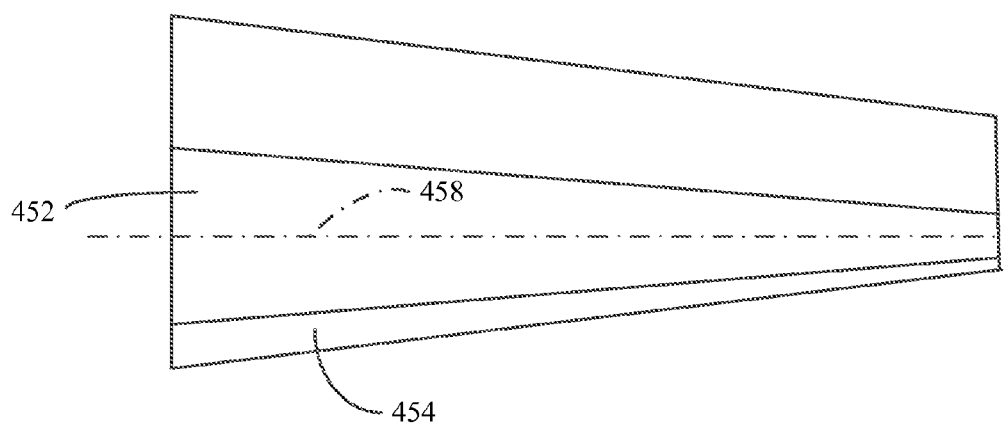
FIG. 4 illustrates an active taper in which a variable mode core is decentered with respect to a cladding.

FIG. 4 illustrates a representative fiber 450 that includes a tapered core 452 that defines a propagation axis 458. A tapered cladding 454 is situated about the core 452, but is not centered on the axis 458. Offsetting the tapered core 452 with respect to the tapered cladding 454 can permit more efficient pumping of the core dopant.

A representative optical amplifier that includes an active taper is illustrated in FIG. 5. A seed laser 502 is configured to produce a seed optical beam at a wavelength suitable for amplification by a selected dopant. Typically, the seed beam has a preferred mode profile such as a lowest order mode profile. The seed beam is directed to a mode filter 504 and then to an active taper 506 that includes an actively doped core. A pump source 508 such as one or more laser diodes that emit at suitable wavelengths is coupled to the active taper.

FIG. 6 illustrates a representative laser 600 that includes an active taper 606 situated in a laser cavity 601 defined by first and second end mirrors 602, 604. A mode filter 608 can also be provided for additional mode control, and an optical pump source 610 such as one or more semiconductor lasers is situated to provide pump radiation to the active taper, typically by coupling pump radiation into an inner cladding. An output beam from the laser cavity can be directed to one or more nonlinear optical devices 612 such as an optical harmonic generator or a parameter oscillator or amplifier. The output beam can also be directed to a pulse compressor 614 that can include, for example, a fiber configured to introduce a frequency chirp and a pair of diffraction gratings. The active taper 606 can include a section of untapered, actively doped optical fiber as well, and additional nonlinear optical devices and polarization sensitive elements can be situated within or exterior to the laser cavity 601.

A pump beam can be coupled to an active taper through one or both of taper input/output surfaces, or through a side of the active taper. In one example, as shown in FIG. 7, a seed laser input fiber 702 and pump fibers 704, 706 are coupled to an active taper 708 with a combiner 705. An output fiber 707 of the combiner 705 is coupled to the active taper 708 that includes a tapered core 710, an inner cladding 712 and an outer cladding 714. Pump radiation can be directed into the pump fibers 704, 706 for pumping a rare earth or other active dopant in the tapered core 710. The seed laser input fiber 702 can be a single mode fiber, a few mode fiber, or a multimode fiber. If a few mode or multimode fiber is used, a mode filter can be provided so that a seed beam propagates in the seed fiber 702 primarily in a fundamental mode. The variable mode core can have a doping that is confined and/or vary along a length of a taper axis 701. For a circularly symmetric taper, rare earth doping $\rho$ can vary as a function z and r, wherein z is measured along the taper axis 701 and r is a radial distance from the taper axis 701, i.e., $\rho=\rho(r,z)$. A core taper can be associated with a core/inner cladding boundary 715. For a circularly symmetric taper, the boundary location $r_{core}=r(z)$. In some examples, $r(z)=r_0 \tan h(\alpha z)$, wherein $r_0$ is a core radius at z=0, and $\alpha$ determines a rate at which the core radius increases. Other functions can be used as a basis for core taper. For confined doping, an active dopant is bounded in the taper by $r_{dopant}=\beta r_0 \tan h(\alpha z)$, wherein $\beta$ is a positive number less than one. Dopant density can vary with both r and z within such a boundary.

Figure 8:
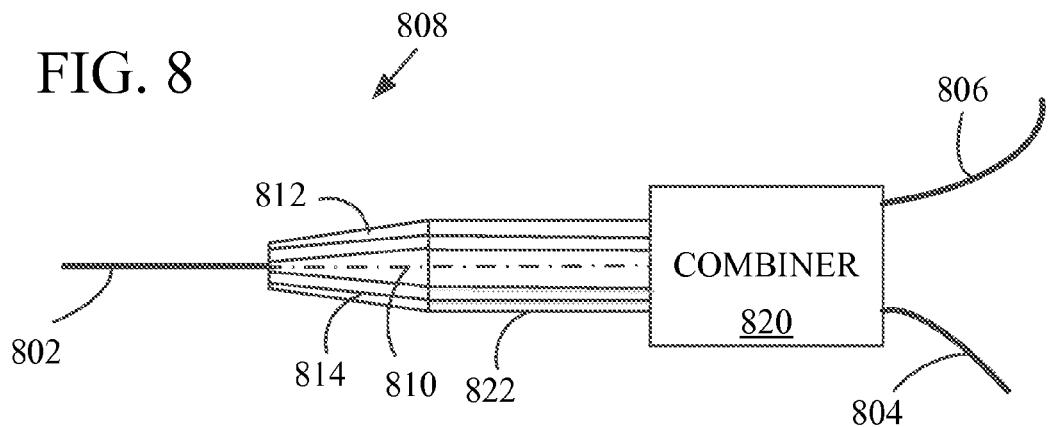
FIG. 8 is a sectional view of an active taper configured for counter-propagating pump radiation.

Referring to FIG. 8, a seed laser input fiber 802 is coupled to an active taper 808 that includes a tapered core 810, an inner cladding 812 and an outer cladding 814. Pump fibers 804, 806 are coupled to a combiner 820 that is in turn coupled to the active taper 808 with an output fiber 822. Pump radiation can be directed into the pump fibers 804, 806 for pumping a rare earth or other active dopant in the tapered core 810 and delivered. The seed laser input fiber 802 can be a single mode fiber, a few mode fiber, or a multimode fiber. If a few mode or multimode fiber is used, a mode filter can be provided so that a seed beam propagates in the seed fiber 802 primarily in a fundamental mode. The configuration of FIG. 8 can be referred to as a counter-propagating configuration, and one or more pump fibers and pump sources can be used.

Figure 9:
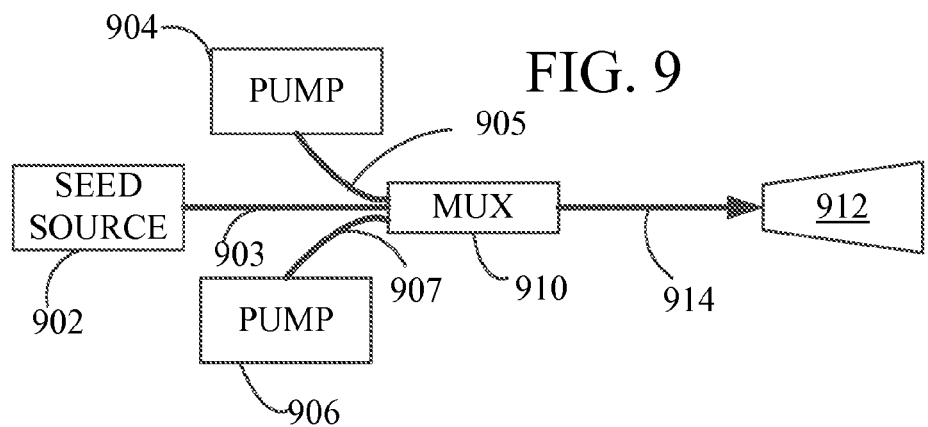
FIG. 9 is a schematic diagram of an active taper configured to be coupled to pump and seed optical beams with a fiber multiplexer or other combiner.

With reference to FIG. 9, a seed optical beam source 902 and one or more pump sources 904, 906 are coupled to a fiber multiplexer (mux) 910 via respective optical fibers 903, 905, 907. A mux output fiber 914 is coupled to an active taper 912 so that the optical radiation from the mux 910 provides both a seed optical beam and pump radiation to the active taper 912.

Figure 10:
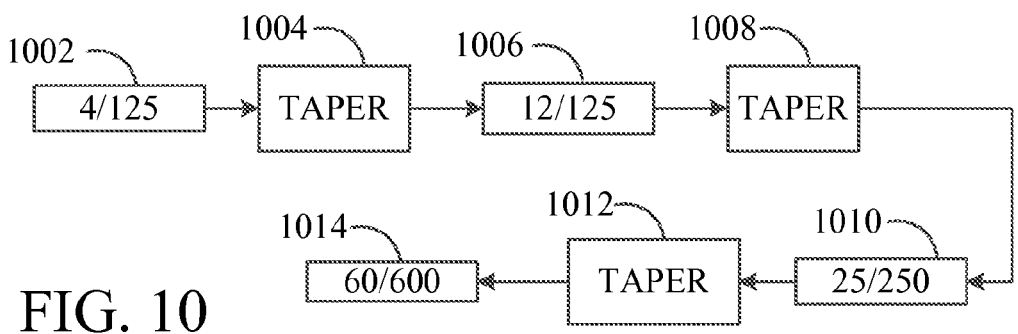
FIG. 10 is a schematic diagram of a representative arrangement of fiber sections coupled by active tapers.

A representative fiber/active taper arrangement is illustrated in FIG. 10. Fibers 1002, 1006, 1010, 1014 are coupled by active tapers 1004, 1008, 1012. For convenient illustration, fibers types are represented as core diameter/cladding diameter with dimensions in µm. Typically, a seed beam is provided to the fiber 1002, and an amplified beam exits the fiber 1014.

Figure 11:
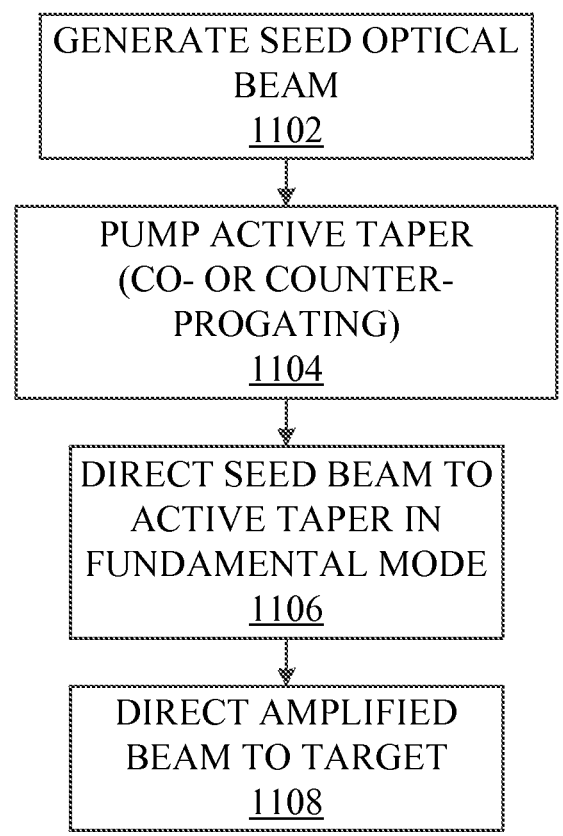
FIG. 11 is a block diagram of a representative method of controlling optical nonlinearities.

A representative method of controlling optical nonlinearities is illustrated in FIG. 11. A seed optical beam is generated at 162. Typically, the seed optical beam propagates in fundamental mode and can be produced directly from a source or provided by mode filtering. At 1104, an active taper is pumped so as to produce optical gain. Co-propagating, counter-propagating, or side pumping can be used. At 1106, the seed beam is directed to the active taper to produce an amplified optical beam, and the amplified optical beam is directed to a target or otherwise used at 1108. Active taper cross-sectional areas can be selected to control radiance. For example, if a peak irradiance is to be less than a predetermined value, modal area in the taper can be selected accordingly so that peak optical power is not limited due to a permitted peak irradiance. Average power and irradiance can also be selected in the same manner.

While the disclosed technology is illustrated above with reference to representative embodiments, these embodiments are not to be taken as limiting. For example, various combinations of tapers can be used, wherein each or some tapers are selected so as to mitigate the effects of amplified spontaneous emission, nonlinear effects, or for other reasons. We claim all that is encompassed by the appended claims.

We claim:

1. An optical amplifier system, comprising:
   an optical resonator defining an optical cavity having an axis;
   a rare earth doped variable mode core situated in the optical cavity along the axis; and
   an optical mode controller situated in the optical cavity along the axis and configured to attenuate higher order modes associated with the variable mode core.

2. The apparatus of claim 1, further comprising at least one seed laser situated so as to direct a seed beam along the axis.

3. The apparatus of claim 2, wherein the seed laser is configured to provide a seed beam propagating substantially in a lowest order mode of the rare earth dope variable mode core.

4. The apparatus of claim 3, wherein the seed beam has a wavelength corresponding to a gain bandwidth of the rare earth variable mode core.

5. The apparatus of claim 4, further comprising an inner cladding and an outer cladding situated about the rare earth doped variable mode core.

6. The apparatus of claim 1, wherein the optical cavity is defined by a first reflector and a second reflector.

7. The apparatus of claim 1, where the optical cavity is defined by at least one fiber Bragg grating, dielectric mirror, or a fiber end facet.

8. The apparatus of claim 1, wherein the optical cavity is a polarization dependent optical cavity.

9. The apparatus of claim 1, further comprising a nonlinear optical element situated to receive an optical output from the optical cavity.

10. The apparatus of claim 1, further comprising a pulse compressor situated to receive an optical output from the optical cavity.

11. A method, comprising:
    directing a seed optical beam to a rare earth, variable mode actively doped taper situated in an optical cavity, the seed optical beam propagating in a fundamental transverse mode, wherein the optical cavity also contains an optical mode controller;
    pumping the actively doped taper to produce optical gain;

attenuating higher order modes associated with the rare earth, variable mode actively doped taper; and amplifying the seed optical beam in the pumped, actively doped taper so as to produce an amplified optical beam propagating in a fundamental mode of the actively doped taper.

12. The method of claim 11, wherein the actively doped taper is pumped so that pump optical radiation propagates in a direction opposite to a direction of propagation of the seed optical beam.

13. The method of claim 11, wherein the actively doped taper is pumped so that pump optical radiation propagates in a direction of propagation of the seed optical beam.

* * * * *